United States Patent [19]

Olstowski

[11] 3,878,524

[45] Apr. 15, 1975

[54] PROCESS FOR PREPARING RADAR REFLECTING MASS

[75] Inventor: Franciszek Olstowski, Freeport, Tex.

[73] Assignee: The Dow Chemical Company, Midland, Mich.

[22] Filed: July 16, 1965

[21] Appl. No.: 472,679

[52] U.S. Cl............................................... 343/18 B
[51] Int. Cl. ........................................... H01q 15/00
[58] Field of Search.................. 343/18, 18 A, 18 B Primary Examiner—Malcolm F. Hubler
Attorney, Agent, or Firm—Raymond B. Ledlie

EXEMPLARY CLAIM

1. A method for producing a radar reflecting cloud of particulate graphite capable of producing a false radar image on a radar scope which comprises:
   1. contacting acid treated graphite with a flowing stream of hot gas at a temperature greater than 150°C. to expand said graphite,
   2. passing said expanded graphite into the atmosphere to produce a false radar image.

4 Claims, No Drawings

PROCESS FOR PREPARING RADAR REFLECTING MASS

This invention relates to a process for producing a radar-reflective mass and more particularly relates to a method for producing large false radar images.

Since the advent of radar as a detecting and tracking means there has been a need to provide adequate radar counter measures. One type of counter measure is to attempt to create a false target image on the enemy radar screen so as to either conceal or disguise the actual target or to provide an electromagnetic radiation-modifying cloud or mass to produce snow or distorted reception on the radar screen. Attempts have been made to produce such reflective clouds by the use of shredded aluminum foil ejected from aircraft, likewise shredded aluminum or aluminum coated plastics have been emitted from jets on the back of ships to provide a large cloud of relatively light particles whose reflection on a radar screen produces an image which may mistakenly be interpreted as a ship or a string of ships or perhaps a large mass of land. For such radar reflective dipoles to be sufficiently light to float on water has also proven to be an advantage. For this purpose, most metals, graphite, and carbon are all known to be sufficiently reflective to radar to produce such false images. The main disadvantage encountered in the past for the use of such materials, however, is that it is necessary to transport a large bulk of comparatively light weight material. This creates a storage problem on shipboard and a much more serious problem of space in an aircraft.

It is an object of this invention therefore to provide an improved process for presenting large false radar images. An additional object of this invention is to provide a means whereby an extremely light weight cloud of radar dipole particles may be produced from a relatively dense mass of material. A further object of this invention is to provide a means for the screening of surface vessels from radar detection. A still further object of this invention is to provide a process whereby false radar targets may be produced by aircraft without the necessity of providing special equipment therefor. These and other objects and many of the intended advantages of this invention will be readily appreciated and become better understood by reference to the following detailed description.

It has now been discovered that electromagnetically dense, light weight clouds or masses may be produced by passing relatively dense particles of expandable graphite into a hot gaseous stream and ejecting the heat expanded graphite particles into the atmosphere. The expandable graphite thus heated will expand to from about 50 to 600 times its original volume, and will pass into the air as an extremely light weight cloud of expanded vermicular graphite.

By the term expandable graphite, as used herein, is meant a graphite capable of expansion by heat and which is prepared from a particulate natural crystalline graphite by treatment with an acid as described hereinafter. To prepare expandable graphite, a particulate natural crystalline graphite is contacted at about room temperature with (1) a mixture of from about 8 to about 98 percent by weight concentrated sulfuric acid (at least 90% by weight $H_2SO_4$) and from about 92 to about 2 weight percent concentrated nitric acid (at least 60 weight percent $HNO_3$), or (2) fuming nitric acid or (3) fuming sulfuric acid or (4) concentrated sulfuric acid (at least 90 weight percent $H_2SO_4$) or concentrated nitric acid (at least 60 weight percent $HNO_3$) plus at least 2% of a solid inorganic oxidizer such as, for example, manganese dioxide, potassium perchlorate, chromium trioxide, potassium chlorate and the like. The resulting mixed components usually are employed on a weight proportion basis of from about 0.2–2/1 (acid member/graphite). These are maintained in contact for at least about 1 minute, although a lengthy contact time of hours or days is not detrimental. The acid treated graphite now expandable is separated from any excess acid and washed and dried if desired. Alternatively, another method of preparing such acid-treated expandable graphite material is by contacting natural crystalline graphite in particulate form with an aqueous peroxy-halo acid, preferably perchloric or periodic acid using an acid concentration of from about 2 to about 70 weight percent or more and an acid/graphite weight proportion of from about 0.5–2/1. Again, the acid-treated graphite is now expandable and may be separated from the excess acid, washed and dried if desired. Likewise, particulate crystalline graphite can be anodically electrolyzed in an aqueous acidic or aqueous salt electrolyte at an electrolyte temperature of from about 0° to about 80°C. at a minimum cell potential of about 2 volts. The total quantity of electricity passed is equivalent to from about 10 to about 50 ampere hours per pound of graphite. The graphite treated in this manner is now expandable and may be separated from the electrolyte solution. The particle size of the crystalline graphite used herein is preferably from about 10 to about 325 mesh U.S. Standard Sieve. A more complete description of such graphite and its method of preparation are found in my copending applications Ser. No. 299,082 filed July 31, 1963; Ser. No. 299,076, filed July 31, 1963; Ser. No. 302,460, filed Aug. 15, 1963; and Ser. No. 331,918, filed Dec. 19, 1963.

While expandable graphite of 30 to 50 mesh U.S. Standard Sieve size has an apparent bulk density of about 51 pounds per cubic foot, such material may be readily expanded from 200 to 600 fold to produce materials having an apparent bulk density as low as 0.2 pound per cubic foot. Such expansion may, in the case of the aqueous peroxy-halo acid treated material or the electrolyzed material, be expanded at temperatures as low as 150° to 200°C. However, ordinarily a gas environment having a temperature of from 500° to about 2,000°C. or higher is generally preferred. As a general rule, as the temperature increases the bulk density of the expanded product decreases. Likewise, as the temperature increases the heating time required to produce expansion decreases. In general, however, expansions are nearly instantaneous and in almost all instances are completed in less than a minute. At the preferred higher temperatures only a fraction of a second to a few seconds is required for complete expansion.

Expandable graphite, as defined herein, may be employed as a radar screening agent for solid fueled rockets by incorporating the expandable graphite into the solid mix from which the fuel is prepared or into the combustion chamber wherein the fuel is burned or into the hot exhaust stream therefrom. Likewise, expandable graphite may be employed as a component in flares, Very pistol shells and the like, to provide a signal which is detectable on radar as well as visually.

The material produced by expansion of the above described acid-treated graphite is a vermicular particulate material having the appearance of malleable graphite worms. The relatively dense acid-treated graphite may therefore be introduced into the hot exhaust stream of a jet aircraft or the hot stack gas of a ship or into a hot gas-producing device designed therefor and be emitted as a light weight cloud of very low density material which will have very high reflectance for a radar signal, thereby creating a large false body or image on a radar screen. Due to the extremely low density of the expanded particles, air turbulence will produce a large cloud which will be maintained air borne for a long period of time. Also, the expanded graphite cloud will diffuse the infra-red energy emitted by the exhaust of an engine and can be a protective device against missiles which will "zero-in" on intense infra-red sources.

EXAMPLE 1

One pound of a commercially available Madagascar flake graphite, having a carbon content of greater than 80% by weight and a mesh size of about 30–50 (U.S. Standard Sieve) is wetted with a 1:1 weight ratio of concentrated sulfuric acid (98 weight percent $H_2SO_4$) and concentrated nitric acid (70 weight percent $HNO_3$) using about one pound of such mixed acids. The flake-acid mixture is allowed to stand at room temperature for about 2 hours, after which period the graphite is washed substantially free of acid. After drying, the expandable particulate graphite has a density of about 51.2 lbs/ft$^3$.

The material is fed into the hot exhaust gas from the afterburner of a jet engine and attains a particle temperature of about 600°–700°C. As expansion takes place, the expanded material is exhausted in the air producing an electromagnetically dense cloud of expanded vermicular graphite particles, having a bulk density of about 0.38 lbs/ft$^3$. This cloud shows on a radar screen as a large irregular mass, falsely indicating a target.

I claim:

1. A method for producing a radar reflecting cloud of particulate graphite capable of producing a false radar image on a radar scope which comprises:
    1. contacting acid treated graphite with a flowing stream of hot gas at a temperature greater than 150°C. to expand said graphite,
    2. passing said expanded graphite into the atmosphere to produce a false radar image.

2. The process of claim 1 wherein the gas temperature is between 500° and 2,000°C.

3. A method for producing a radar reflecting cloud of particulate graphite capable of producing a false radar image which comprises providing an aircraft engine, contacting acid treated graphite with the hot exhaust stream of said aircraft engine to expand said graphite and passing said expanded graphite into the atmosphere to produce a cloud of particulate graphite as a said false radar image.

4. The method of claim 3 wherein the aircraft engine is a jet engine.

* * * * *